US012490949B2

(12) United States Patent
Tsuji (10) Patent No.: US 12,490,949 B2
(45) Date of Patent: Dec. 9, 2025

(54) SETTING DEVICE, SETTING METHOD, AND SETTING PROGRAM (71) Applicant: FUJIFILM CORPORATION, Tokyo (JP)

(72) Inventor: Tetsuya Tsuji, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 218 days.

(21) Appl. No.: 18/188,460

(22) Filed: Mar. 23, 2023

(65) Prior Publication Data

US 2023/0225690 A1 Jul. 20, 2023

Related U.S. Application Data (63) Continuation of application No. PCT/JP2021/028492, filed on Jul. 30, 2021.

(30) Foreign Application Priority Data

Sep. 25, 2020 (JP) ................. 2020-161413

(51) Int. Cl.
*A61B 6/00* (2024.01)
(52) U.S. Cl.
CPC .............. *A61B 6/488* (2013.01); *A61B 6/544* (2013.01)
(58) Field of Classification Search
CPC ......... A61B 6/488; A61B 6/544; A61B 6/542; A61B 6/545
See application file for complete search history.

(56) References Cited

U.S. PATENT DOCUMENTS 6,426,996 B1 * 7/2002 Moribe ..................... H05G 1/58
378/138
7,313,224 B1 * 12/2007 Saunders ............... A61B 6/544
378/108

(Continued)

FOREIGN PATENT DOCUMENTS

JP H04-150839 A 5/1992
JP 2006-218142 A 8/2006

(Continued)

OTHER PUBLICATIONS

English language translation of the following: Office action dated Apr. 16, 2024 from the JPO in a Japanese patent application No. 2022-551170 corresponding to the instant patent application.

(Continued)

*Primary Examiner* — David J Makiya
*Assistant Examiner* — Soorena Kefayati
(74) *Attorney, Agent, or Firm* — SOLARIS Intellectual Property Group, PLLC (57) ABSTRACT

A setting device includes at least one processor configured to acquire imaging part information indicating an imaging part of a subject captured by a radiation emitting device, acquire body thickness information, and derive target values of a tube voltage and a mAs value for emitting the radiation such that a dose of the radiation transmitted through the imaging part is the same as a dose at a reference body thickness, based on the acquired body thickness information and the acquired imaging part information. The at least one processor is also configured to derive a set value of a tube current for obtaining the target mAs value and a set value of an irradiation time of the radiation based on at least one of an upper limit value of the irradiation time, a tube current corresponding to a focus size, or a maximum output value of a tube.

10 Claims, 5 Drawing Sheets

(56) References Cited

U.S. PATENT DOCUMENTS

| | | | | |
|---|---|---|---|---|
| 2002/0085672 | A1* | 7/2002 | Ganin | H05G 1/44 378/108 |
| 2003/0165216 | A1* | 9/2003 | Walker | A61B 6/544 378/108 |
| 2005/0152493 | A1* | 7/2005 | Seto | A61B 6/542 378/20 |
| 2007/0071172 | A1* | 3/2007 | Mollus | A61B 6/00 378/108 |
| 2008/0103834 | A1* | 5/2008 | Reiner | G16H 20/40 705/3 |
| 2008/0253532 | A1* | 10/2008 | Hess | H05G 1/32 378/108 |
| 2014/0355735 | A1* | 12/2014 | Choi | A61B 6/022 378/54 |
| 2015/0071406 | A1* | 3/2015 | Temmei | G06T 7/11 378/62 |
| 2015/0250440 | A1* | 9/2015 | Sugahara | A61B 6/502 378/37 |
| 2016/0019701 | A1* | 1/2016 | Visser | A61B 5/0059 378/19 |
| 2017/0000445 | A1* | 1/2017 | Beak | A61B 6/502 |
| 2017/0020476 | A1* | 1/2017 | Hatakeyama | A61B 6/585 |
| 2017/0209105 | A1* | 7/2017 | Fan | A61B 6/544 |
| 2018/0000438 | A1* | 1/2018 | Abe | A61B 6/487 |
| 2018/0199907 | A1* | 7/2018 | Hatakeyama | H05G 1/26 |
| 2019/0059829 | A1* | 2/2019 | Han | A61B 6/469 |

FOREIGN PATENT DOCUMENTS

| | | |
|---|---|---|
| JP | 2007-213979 A | 8/2007 |
| JP | 2010-102877 A | 5/2010 |
| JP | 2017-023487 A | 2/2017 |
| JP | 2017-051752 A | 3/2017 |

OTHER PUBLICATIONS

Extended European Search Report dated Jan. 29, 2024, issued in corresponding EP Patent Application No. 21871976.3.

International Search Report issued in International Application No. PCT/JP2021/028492 on Oct. 12, 2021.

Written Opinion of the ISA issued in International Application No. PCT/JP2021/028492 on Oct. 12, 2021.

Office Action dated Dec. 17, 2024, issued by the EPO in corresponding EP Patent Application No. 21871976.3.

\* cited by examiner

| IMAGING PART | UPPER LIMIT VALUE OF IRRADIATION TIME (ms) |
|---|---|
| CHEST (FRONT) | 100 |
| CHEST (SIDE) | 100 |
| OTHERS | 500 |

SETTING DEVICE, SETTING METHOD, AND SETTING PROGRAM

CROSS REFERENCE TO RELATED APPLICATIONS

This application is a continuation of International Application No. PCT/JP2021/028492, filed on Jul. 30, 2021, which claims priority from Japanese Patent Application No. 2020-161413, filed on Sep. 25, 2020. The entire disclosure of each of the above applications is incorporated herein by reference.

BACKGROUND

Technical Field

The present disclosure relates to a setting device, a setting method, and a setting program.

Related Art

In general, in a case in which a radiographic image of a subject is captured by radiation emitted from a radiation emitting device, imaging conditions related to a tube voltage and a mAs value of a radiation source that emits the radiation are set for the radiation emitting device. For example, JP2006-218142A discloses a technique that sets imaging conditions corresponding to an imaging part and a body thickness of a subject.

In the technique disclosed in JP2006-218142A, in some cases, it is difficult to set the imaging conditions. For example, in a case in which a target mAs value is set in the radiation emitting device, it may be difficult to determine how to distribute and set a tube current value and the irradiation time of the radiation.

SUMMARY

The present disclosure has been made in view of the above circumstances and provides a setting device, a setting method, and a setting program that can easily set imaging conditions corresponding to an imaging part and a body thickness of a subject.

According to a first aspect of the present disclosure, there is provided a setting device comprising at least one processor. The processor acquires imaging part information indicating an imaging part of a subject whose radiographic image is captured by radiation emitted from a radiation emitting device, acquires body thickness information indicating a body thickness of the subject in a direction in which the radiation is transmitted, derives target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information, and derives a set value of a tube current of the radiation emitting device for obtaining the target mAs value and a set value of an irradiation time of the radiation on the basis of at least one of an upper limit value of the irradiation time, a tube current corresponding to a focus size, or a maximum output value of a tube of the radiation emitting device.

According to a second aspect of the present disclosure, in the setting device according to the first aspect, the upper limit value of the irradiation time may be determined according to at least one of the imaging part, an age of the subject, or a gender of the subject.

According to a third aspect of the present disclosure, in the setting device according to the first aspect or the second aspect, the focus size may include a small focus and a large focus that is larger than the small focus. In a case in which the focus size is the small focus, and an irradiation time of the radiation, when the target mAs value is obtained by an upper limit value of the tube current, is within the upper limit value of the irradiation time, the processor may derive the upper limit value of the tube current as the set value of the tube current and derive the irradiation time of the radiation when the target mAs value is obtained by the upper limit value of the tube current as the set value of the irradiation time.

According to a fourth aspect of the present disclosure, in the setting device according to the first aspect or the second aspect, the focus size may include a small focus and a large focus that is larger than the small focus. In a case in which the focus size is the small focus, and an irradiation time of the radiation, when the target mAs value is obtained by an upper limit value of the tube current, exceeds the upper limit value of the irradiation time, the processor may derive the upper limit value of the irradiation time as the set value of the irradiation time, and derive a tube current value at which the target mAs value is obtained by the set value of the irradiation time as the set value of the tube current.

According to a fifth aspect of the present disclosure, in the setting device according to the first aspect or the second aspect, the focus size may include a small focus and a large focus that is larger than the small focus. In a case in which the focus size is the small focus, and an irradiation time of the radiation, when the target mAs value is obtained by an upper limit value of the tube current, exceeds the upper limit value of the irradiation time, the processor may derive, as the set value of the tube current, a tube current value of the tube current in a case in which the focus size is the large focus and derive an irradiation time of the radiation when the target mAs value is obtained by the set value of the tube current as the set value of the irradiation time.

According to a sixth aspect of the present disclosure, in the setting device according to any one of the first to fifth aspects, the processor may acquire the imaging part information from an imaging menu.

According to a seventh aspect of the present disclosure, in the setting device according to any one of the first to sixth aspects, the processor may acquire the body thickness information by subtracting an SSD from an STD to derive the body thickness.

According to an eighth aspect of the present disclosure, in the setting device according to any one of the first to sixth aspects, the processor may acquire the body thickness information by subtracting an SSD and a TID from an SID to derive the body thickness.

According to a ninth aspect of the present disclosure, in the setting device according to any one of the first to eighth aspects, the processor may output the target value of the tube voltage, the set value of the tube current, and the set value of the irradiation time to the radiation emitting device.

In addition, according to a tenth aspect of the present disclosure, there is provided a setting method executed by a processor. The setting method comprises: acquiring imaging part information indicating an imaging part of a subject whose radiographic image is captured by radiation emitted from a radiation emitting device; acquiring body thickness information indicating a body thickness of the subject in a direction in which the radiation is transmitted; deriving target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and deriving a set value of a tube current of the radiation emitting device for obtaining the target mAs value and a set value of an irradiation time of the radiation on the basis of at least one of an upper limit value of the irradiation time, a tube current corresponding to a focus size, or a maximum output value of a tube of the radiation emitting device.

Further, according to an eleventh aspect of the present disclosure, there is provided a setting program that causes a processor to execute a process comprising: acquiring imaging part information indicating an imaging part of a subject whose radiographic image is captured by radiation emitted from a radiation emitting device; acquiring body thickness information indicating a body thickness of the subject in a direction in which the radiation is transmitted; deriving target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and deriving a set value of a tube current of the radiation emitting device for obtaining the target mAs value and a set value of an irradiation time of the radiation on the basis of at least one of an upper limit value of the irradiation time, a tube current corresponding to a focus size, or a maximum output value of a tube of the radiation emitting device.

According to the present disclosure, it is possible to easily set the imaging conditions corresponding to the imaging part and the body thickness of the subject.

DETAILED DESCRIPTION

Hereinafter, embodiments of the invention will be described in detail with reference to the drawings. In addition, each of the embodiments does not limit the invention.

Figure 1:
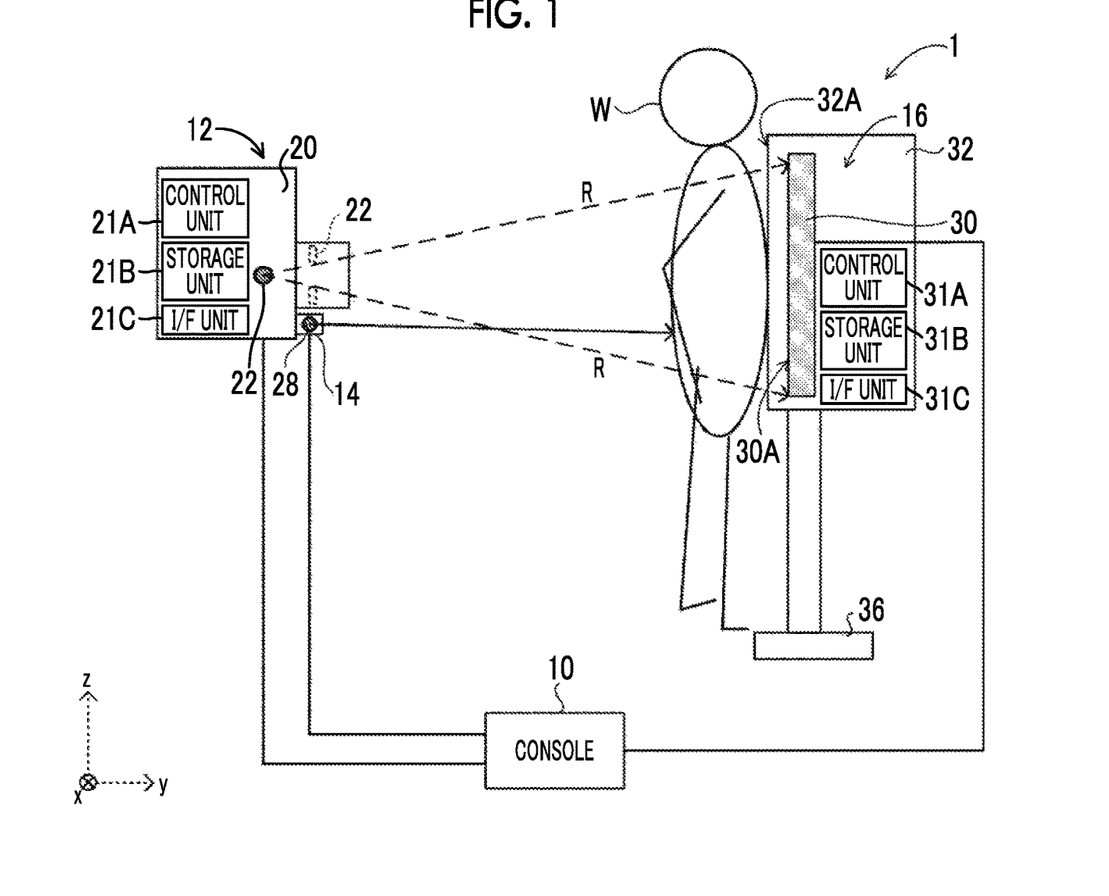
FIG. 1 is a diagram schematically illustrating an example of an overall configuration of a radiography system according to an embodiment.

First, an example of an overall configuration of a radiography system according to this embodiment will be described. FIG. 1 is a diagram illustrating an example of the overall configuration of a radiography system 1 according to this embodiment. As illustrated in FIG. 1, the radiography system 1 according to this embodiment comprises a console 10, a radiation emitting device 12, a time-of-flight (TOF) camera 14, and a radiography apparatus 16. The console 10 according to this embodiment is an example of a setting device according to the present disclosure. In addition, FIG. 1 illustrates an aspect in which a radiographic image is captured in a state in which a subject W is standing up (standing state). However, the state of the subject W is not limited. For example, the subject W may be in a state (sitting state) in which it is sitting on a chair including a wheelchair or in a state in which it lies on an imaging table 32 (lying state).

The radiation emitting device 12 according to this embodiment comprises a radiation source 20 that irradiates the subject W, which is an example of an object to be imaged, with radiation R, such as X-rays, and a collimator 24 that limits an irradiation field of the radiation R emitted from the radiation source 20. In addition, the radiation emitting device 12 comprises a control unit 21A, a storage unit 21B, and an interface (I/F) unit 21C.

The control unit 21A controls the radiation source 20 and the collimator 24 under the control of the console 10. The control unit 21A comprises a central processing unit (CPU), a read only memory (ROM), and a random access memory (RAM) which are not illustrated. Various programs, which include an irradiation processing program for causing the radiation source 20 to irradiate the subject W with the radiation R in the capture of a radiographic image and are executed by the CPU, are stored in the ROM in advance. The RAM temporarily stores various types of data.

For example, various types of information are stored in the storage unit 21B. Specific examples of the storage unit 21B include a hard disk drive (HDD) and a solid state drive (SSD). The I/F unit 21C transmits and receives various types of information to and from the console 10 using wireless communication or wired communication. The radiation emitting device 12 receives imaging conditions (which will be described in detail below) derived by the console 10 through the I/F unit 21C.

A method by which a user, such as a doctor or a technician, instructs the radiation emitting device 12 to emit the radiation R is not limited. For example, in a case in which the radiation emitting device 12 comprises an irradiation button or the like, the user, such as a radiology technician, may input an instruction to emit the radiation R with the irradiation button such that the radiation R is emitted from the radiation emitting device 12. Further, for example, the user, such as the radiology technician, may operate the console 10 to input the instruction to emit the radiation R such that the radiation R is emitted from the radiation emitting device 12.

In a case in which the radiation emitting device 12 receives the instruction to emit the radiation R, the control unit 21A directs the radiation source 20 to emit the radiation R from a focus 22 of a radiation tube according to the imaging conditions, such as a tube voltage, a tube current, and an irradiation time, set by the console 10. For example, in this embodiment, the irradiation field has a rectangular shape. Therefore, a rectangular-pyramid-shaped region that has the focus 22 as the apex and the irradiation field as the base is irradiated with the radiation R emitted from the focus 22.

Further, as illustrated in FIG. 1, the TOF camera 14 is provided in the vicinity of an exit port through which the radiation R is emitted from the radiation emitting device 12. The TOF camera 14 is a camera that captures a distance image indicating a distance to the object to be imaged using the TOF method with an imaging element 28. Specifically, the TOF camera 14 irradiates the object to be imaged with light, such as infrared rays, and measures the distance between the TOF camera 14 and the object to be imaged on the basis of the time until reflected light is received or a phase change between the emitted light and the received light. In the distance image captured by the TOF camera 14, each pixel has distance information indicating the distance between the TOF camera 14 and the object to be imaged. In addition, in the TOF camera 14 according to this embodiment, the distance between the imaging element 28 and the object to be imaged is applied as the distance between the TOF camera 14 and the object to be imaged. Further, the distance image is an image from which the distance to the object to be imaged can be derived.

The radiography apparatus 16 comprises a radiation detector 30, a control unit 31A, a storage unit 31B, and an I/F unit 31C.

The radiation detector 30 has a function of generating a radiographic image. As illustrated in FIG. 1, the radiation detector 30 is disposed in the imaging table 32. In the radiography apparatus 16 according to this embodiment, in a case in which imaging is performed, the subject W is positioned on an imaging surface 32A of the imaging table 32 by the user.

The radiation detector 30 detects the radiation R transmitted through the subject W and the imaging table 32, generates a radiographic image on the basis of the detected radiation R, and outputs image data indicating the generated radiographic image. The type of the radiation detector 30 according to this embodiment is not particularly limited. For example, the radiation detector 30 may be an indirect-conversion-type radiation detector that converts the radiation R into light and converts the converted light into charge or a direct-conversion-type radiation detector that directly converts the radiation R into charge.

The control unit 31A controls the overall operation of the radiography apparatus 16 under the control of the console 10. The control unit 31A comprises a CPU, a ROM, and a RAM which are not illustrated. For example, various programs, which include an imaging processing program for performing control related to the capture of radiographic images and are executed by the CPU, are stored in the ROM in advance. The RAM temporarily stores various types of data.

For example, the image data of the radiographic image captured by the radiation detector 30 and various other types of information are stored in the storage unit 31B. An HDD or an SSD is given as a specific example of the storage unit 31B. The I/F unit 31C transmits and receives various types of information to and from the console 10 using wireless communication or wired communication. The image data of the radiographic image captured by the radiation detector 30 is transmitted to the console 10 through the I/F unit 31C by wireless communication or wired communication.

Meanwhile, the console 10 according to this embodiment has a function of controlling the radiation emitting device 12, the TOF camera 14, and the radiography apparatus 16 using, for example, an imaging order and various types of information acquired from a radiology information system (RIS) (not illustrated) or the like through a wireless communication local area network (LAN) or the like.

Figure 2:
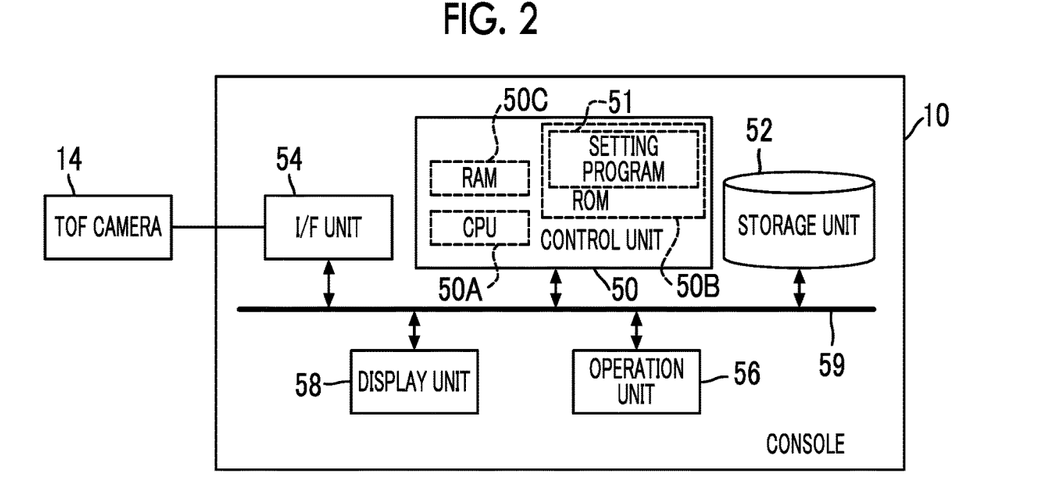
FIG. 2 is a block diagram illustrating an example of a configuration of a console according to the embodiment.

For example, the console 10 according to this embodiment is a server computer. As illustrated in FIG. 2, the console 10 comprises a control unit 50, a storage unit 52, an I/F unit 54, an operation unit 56, and a display unit 58. The control unit 50, the storage unit 52, the I/F unit 54, the operation unit 56, and the display unit 58 are connected to each other through a bus 59, such as a system bus or a control bus, such that they can transmit and receive various types of information.

The control unit 50 according to this embodiment controls the overall operation of the console 10. The control unit 50 comprises a CPU 50A, a ROM 50B, and a RAM 50C. For example, various programs including a setting program 51 executed by the CPU 50A are stored in the ROM 50B in advance. The RAM 50C temporarily stores various types of data. The CPU 50A according to this embodiment is an example of a processor according to the present disclosure. In addition, the setting program 51 according to this embodiment is an example of a setting program according to the present disclosure.

For example, the image data of the radiographic image captured by the radiography apparatus 16 and various types of information including the imaging order acquired from the RIS are stored in the storage unit 52. An HDD or an SSD is given as a specific example of the storage unit 52.

The operation unit 56 is used by the user to designate an imaging menu corresponding to an imaging order and to input instructions related to the capture of a radiographic image including an instruction to emit the radiation R, various types of information, and the like. The operation unit 56 is not particularly limited. Examples of the operation unit 56 include various switches, a touch panel, a touch pen, and a mouse. The display unit 58 is used to display various types of information. In addition, the operation unit 56 and the display unit 58 may be integrated into a touch panel display.

The console 10 displays a plurality of types of imaging menus prepared in advance on the display unit 58 such that one of the menus can be selected. The user selects one imaging menu that is matched with the content of the imaging order through the operation unit 56. In this embodiment, the imaging menu is predetermined for each of imaging parts, such as the head, the chest, the abdomen, and the spine, and the user selects an imaging part to select an imaging menu. Therefore, the console 10 receives the designation of the imaging menu.

The I/F unit 54 transmits and receives various types of information to and from the radiography apparatus 16 and the RIS (not illustrated) using wireless communication or wired communication. In the radiography system 1 according to this embodiment, the console 10 receives the image data of the radiographic image captured by the radiography apparatus 16 from the radiography apparatus 16 through the I/F unit 54, using wireless communication or wired communication.

Figure 3:
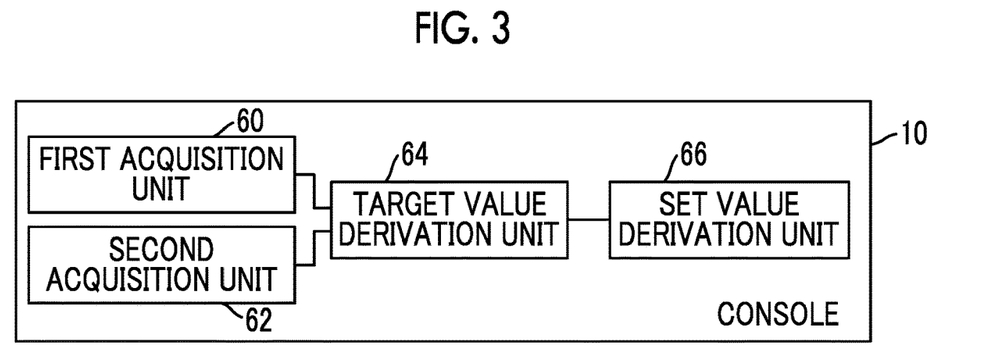
FIG. 3 is a functional block diagram illustrating an example of a functional configuration of the console according to the embodiment.

In addition, FIG. 3 is a functional block diagram illustrating an example of the functional configuration of the console 10 according to this embodiment. As illustrated in FIG. 3, the console 10 comprises a first acquisition unit 60, a second acquisition unit 62, a target value derivation unit 64, and a set value derivation unit 66. For example, in the console 10 according to this embodiment, the CPU 50A of the control unit 50 executes the setting program 51 stored in the ROM 50B to function as the first acquisition unit 60, the second acquisition unit 62, the target value derivation unit 64, and the set value derivation unit 66.

The first acquisition unit 60 has a function of acquiring imaging part information indicating an imaging part of the subject W. For example, in this embodiment, the imaging part information is acquired from the received imaging menu. In addition, the method by which the first acquisition unit 60 acquires the imaging part information is not particularly limited. For example, in a case in which the imaging part information is included in the imaging order, the imaging part information may be acquired from the imaging order. The imaging part information acquired by the first acquisition unit 60 is output to the target value derivation unit 64.

The second acquisition unit 62 has a function of acquiring body thickness information indicating a body thickness of the subject W in a direction in which the radiation R is transmitted. In addition, in this embodiment, the term "body thickness" means a body thickness of the subject W in the direction in which the radiation R is transmitted. For example, the second acquisition unit 62 according to this embodiment acquires the distance image captured by the TOF camera 14 and derives the body thickness from the acquired distance image to acquire the body thickness information. For example, the second acquisition unit 62 according to this embodiment acquires image data indicating the distance image captured by the TOF camera 14 from the TOF camera 14 through the I/F unit 31C and the I/F unit 54. Then, the second acquisition unit 62 derives the body thickness on the basis of the acquired distance image to acquire the body thickness information. The body thickness information acquired by the second acquisition unit 62 is output to the target value derivation unit 64.

An example of a method for deriving the body thickness will be described with reference to FIG. 4.

As described above, in this embodiment, the body thickness is derived from the distance image captured by the TOF camera 14. The TOF camera 14 measures a distance between the TOF camera 14 and an object to be measured. As illustrated in FIGS. 1 and 4, in this embodiment, since the position of the imaging element 28 of the TOF camera 14 is different from the position of the focus 22 of the radiation source 20, the distance to the object to be measured which has been measured by the TOF camera 14 is different from the distance between the radiation source 20 and the object to be measured. In the radiography system 1 according to this embodiment, a relative positional relationship between the TOF camera 14 and the radiation source 20 is predetermined. Therefore, a conversion coefficient for converting the distance to the object to be measured, which has been measured by the TOF camera 14, into the distance between the radiation source 20 and the object to be measured is stored in advance in the storage unit 52 of the console 10.

Figure 4:
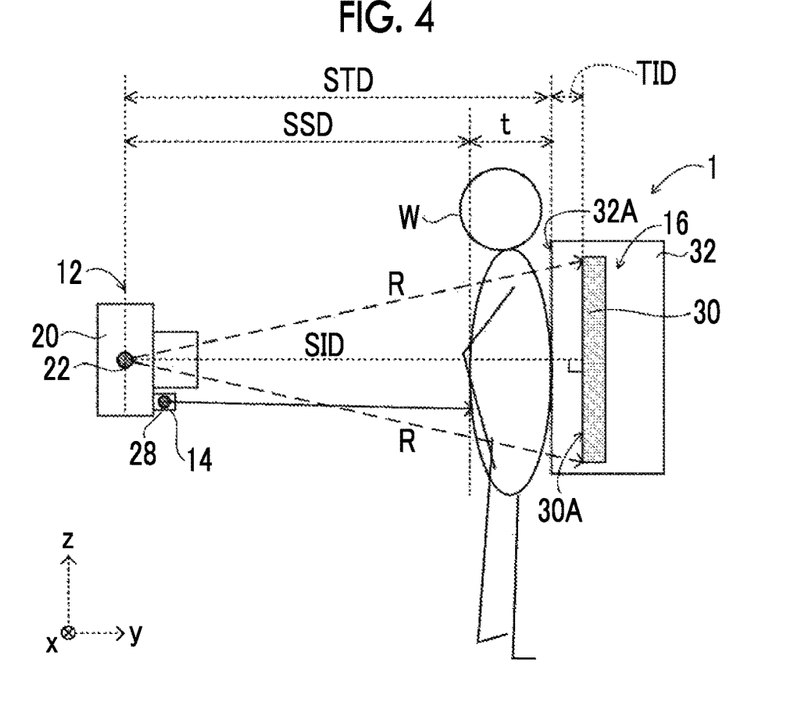
FIG. 4 is a diagram illustrating a method for acquiring a body thickness.

As illustrated in FIG. 4, the second acquisition unit 62 according to this embodiment derives a body thickness t using the following Expression (1) on the basis of a source target distance (STD) and a source-to-skin distance (SSD).

$$t = STD - SSD \qquad (1)$$

The STD is a distance between the radiation source 20 and a target (object to be imaged). In this embodiment, as illustrated in FIG. 4, the STD means a distance between the focus 22 of the radiation source 20 and the imaging surface 32A of the imaging table 32. Specifically, the STD means the length of a perpendicular line drawn from the focus 22 of the radiation source 20 to the imaging surface 32A of the imaging table 32.

Specifically, the position of the imaging surface 32A of the imaging table 32 which is not hidden by the subject W is predetermined as a measurement position in order to derive the STD. The second acquisition unit 62 derives the distance between the TOF camera 14 and the measurement position from distance information included in a pixel which corresponds to the measurement position in the distance image. Further, in a case in which the measurement position is different from the foot of the perpendicular line drawn from the TOF camera 14 to the imaging surface 32A of the imaging table 32, the second acquisition unit 62 converts the derived distance between the TOF camera 14 and the measurement position into the length of the perpendicular line drawn from the TOF camera 14 to the imaging surface 32A of the imaging table 32. Furthermore, the second acquisition unit 62 derives the STD by converting the distance between the TOF camera 14 and the imaging surface 32A of the imaging table 32 into the distance between the radiation source 20 and the imaging surface 32A of the imaging table 32, using a conversion coefficient for deriving the STD among the conversion coefficients stored in the storage unit 52.

In addition, in a case in which the STD is predetermined and is, for example, a fixed value corresponding to the imaging part, the STD may be stored in the storage unit 52 in advance, and the second acquisition unit 62 may acquire the STD from the storage unit 52.

Further, the SSD is the distance between the radiation source 20 and the surface (skin) of the subject W, that is, a distance from the radiation source 20 to the subject W. In this embodiment, the SSD means the distance from the focus 22 of the radiation source 20 to the body surface of the subject W facing the focus 22 as illustrated in FIG. 4. Specifically, the SSD means the length of a perpendicular line drawn from the focus 22 of the radiation source 20 to the subject W.

More specifically, the second acquisition unit 62 derives the distance between the TOF camera 14 and the subject W from the distance information included in the pixels corresponding to the subject W in the distance image captured by the TOF camera 14. Further, the second acquisition unit 62 derives the SSD by converting the distance between the TOF camera 14 and the subject W into the distance between the radiation source 20 and the subject W, using a conversion coefficient for deriving the SSD among the conversion coefficients stored in the storage unit 52.

In addition, the method by which the second acquisition unit 62 derives the body thickness t is not limited to the above-described method. For example, the second acquisition unit 62 may derive the body thickness t using the following Expression (2) on the basis of a source-to-image receptor distance (SID), the SSD, and a target-to-image receptor distance (TID).

$$t = SID - SSD - TID \qquad (2)$$

The SID is the distance between the radiation source 20 and the radiation detector 30. Further, in this embodiment, the SID means the length of a perpendicular line drawn from the focus 22 of the radiation source 20 to a detection surface 30A of the radiation detector 30 as illustrated in FIG. 4. For example, in this embodiment, the SID is a fixed value corresponding to the imaging part, is predetermined, and is stored in the storage unit 52 in advance. Therefore, the second acquisition unit 62 acquires the SID from the storage unit 52.

In addition, unlike this embodiment, the SID may be measured whenever a radiographic image is captured. In this case, for example, the second acquisition unit 62 may acquire a measurement result of the SID by a measurement device such as a linear encoder.

Further, the TID is the distance between the target (object to be imaged) and the radiation detector 30. In this embodiment, the TID means the distance from the detection surface 30A of the radiation detector 30 to the imaging surface 32A of the imaging table 32. For example, in this embodiment, the TID is a fixed value, is predetermined as a design value of the imaging table 32, and is stored in the storage unit 52 in advance. Therefore, the second acquisition unit 62 acquires the TID from the storage unit 52.

The target value derivation unit 64 derives a target value of the tube voltage and a target value of a mAs value of the radiation emitting device 12 for emitting the radiation R such that a dose of the radiation R transmitted through the imaging part of the subject W is the same as a dose at a reference body thickness, on the basis of the imaging part indicated by the imaging part information input from the first acquisition unit 60 and the body thickness indicated by the body thickness information input from the second acquisition unit 62. Here, the term "same" is not limited to "exact same" and may have, for example, an error in an allowable range. In addition, in this embodiment, the reference body thickness is an average value of the body thicknesses of a plurality of subjects W.

For example, in this embodiment, correspondence relationship information (not illustrated) indicating a correspondence relationship among the body thickness, the target value of the tube voltage, and the target value of the mAs value is stored in advance in the storage unit 52 for each imaging part. The target value derivation unit 64 derives the target value of the tube voltage and the target value of the mAs value from the correspondence relationship information which corresponds to the imaging part indicated by the imaging part information acquired by the first acquisition unit 60.

In addition, the correspondence relationship information is determined on the basis of a reference value of the SID. Therefore, in a case in which the SID in the current measurement of the subject W is different from the reference value of the SID, it is preferable to correct the mAs value derived from the correspondence relationship information using the following Expression (3).

Corrected mAs value=mAs value of correspondence relationship information×(current SID/reference value of SID)$^2$ (3)

The set value derivation unit 66 derives a set value of the tube current of the radiation emitting device 12 for obtaining the target mAs value derived by the target value derivation unit 64 and a set value of the irradiation time of the radiation R on the basis of at least one of the upper limit value of the irradiation time, a tube current corresponding to a focus size, or the maximum output value of a tube of the radiation source 20. The set value derivation unit 66 outputs the derived set values of the tube current and the irradiation time of the radiation R to the radiation emitting device 12.

Figure 5:
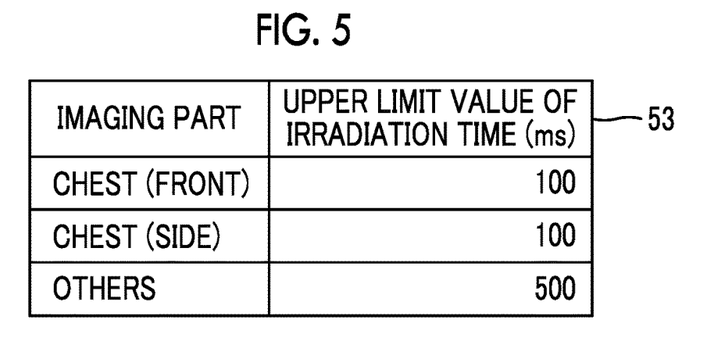
FIG. 5 is a diagram illustrating an example of irradiation time upper limit value information indicating a correspondence relationship between an imaging part and an upper limit value of an irradiation time.

The upper limit value of the irradiation time is determined according to the body movement of the subject. In a case in which the body movement occurs in the subject, specifically, a region of interest, an image of the region of interest in the radiographic image blurs. Therefore, the upper limit value of the irradiation time is determined from the viewpoint of suppressing the blurring of the image of the region of interest. For example, the upper limit value of the irradiation time is determined according to at least one of the imaging part, the age of the subject, or the gender of the subject. For example, in the console 10 according to this embodiment, irradiation time upper limit value information related to the upper limit value of the irradiation time is stored in advance in the storage unit 52 (not illustrated in FIG. 2). FIG. 5 illustrates an example of irradiation time upper limit value information 53 indicating a correspondence relationship between the imaging part and the upper limit value of the irradiation time.

The amount of body movement varies according to the heartbeat or the movement of the internal organs, depending on the imaging part. For example, the heart moves more frequently than other internal organs. Therefore, in this embodiment, in a case in which the heart is included in the imaging part as in the irradiation time upper limit value information 53 illustrated in FIG. 5, the upper limit value of the irradiation time is smaller than that in a case in which other imaging parts are imaged.

In addition, for example, in a case in which the age of the subject corresponds to a newborn baby or an elderly person, there is a tendency that the subject is likely to move. Therefore, in a case in which the age of the subject corresponds to a newborn baby or an elderly person, the upper limit value of the irradiation time is smaller than that in a case in which the age of the subject corresponds to a teenager or an adult. In addition, for example, in a case in which the gender of the subject is a female, there is a tendency that the subject is more likely to move than in a case in which the gender of the subject is a man. Therefore, in a case in which the gender of the subject is a female, the upper limit value of the irradiation time is smaller than that in a case in which the gender of the subject is a male.

Meanwhile, the focus size depends on the tube current and the tube voltage. As the focus size is larger, the tube current is larger. For example, in a case in which the focus size is a small focus, the tube current is equal to or greater than 10 mA and equal to or less than 200 mA. In a case in which the focus size is a large focus, the tube current is equal to or greater than 250 mA and equal to or less than 500 mA. As the focus size is larger, the radiographic image is more likely to be blurred. Therefore, in this embodiment, priority is given to setting the focus size to the small focus, and priority is given to setting a tube current value corresponding to the small focus. For example, in the console 10 according to this embodiment, information (not illustrated) indicating a correspondence relationship between the range of the tube current value in a case in which the focus size is the small focus and the range of the tube current value in a case in which the focus size is the large focus is stored in the storage unit 52 in advance.

Further, the maximum output value of the tube of the radiation source 20 which is determined by the product of the tube voltage and the tube current (a tube voltage value kV×a tube current value mA) is predetermined according to the radiation emitting device 12. Therefore, in this embodiment, the tube voltage and the tube current are set not to exceed the maximum output value of the tube of the radiation source 20.

For example, in the console 10 according to this embodiment, information (not illustrated) indicating the correspondence relationship between the range of the tube current value in a case in which the focus size is the small focus and the range of the tube current value in a case in which the focus size is the large focus is stored in the storage unit 52 in advance. For example, in the console 10 according to this embodiment, information (not illustrated) indicating the maximum output value of the tube of the radiation source 20 is stored in the storage unit 52 in advance.

In the set value derivation unit 66 according to this embodiment, the priorities of the upper limit value of the irradiation time, the tube current corresponding to the focus size, and the maximum output value of the tube of the radiation source 20 are predetermined. The maximum output value of the tube of the radiation source 20 has the highest priority. In other words, the setting of the tube voltage and the tube current to the values which do not exceed the maximum output value of the tube of the radiation source 20 has the highest priority. In addition, the tube current corresponding to the focus size has the lowest priority. In other words, the setting of the tube current value of the tube current to a value corresponding to the focus size has the lowest priority. Further, these priorities are not limited to this embodiment. Furthermore, the user may set these priorities.

Next, the operation of the console 10 according to this embodiment will be described with reference to the drawings.

Figure 6:
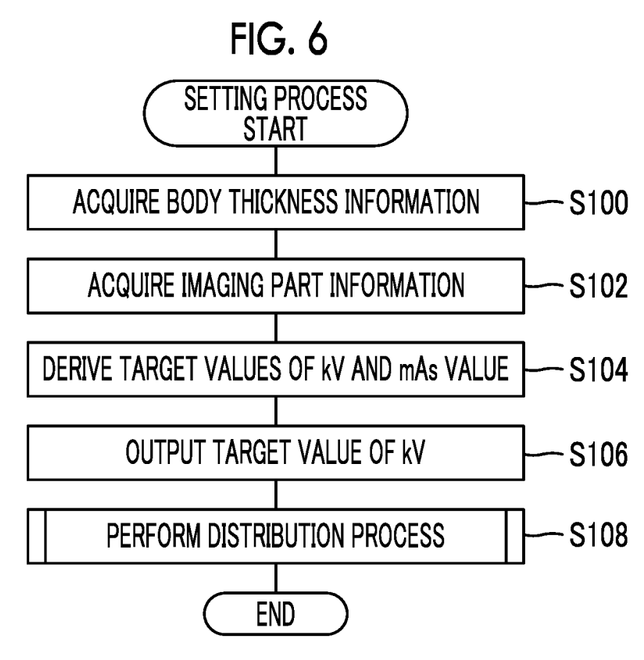
FIG. 6 is a flowchart illustrating an example of a flow of a setting process of the console according to the embodiment.

In the console 10 according to this embodiment, the CPU 50A of the control unit 50 executes the setting program 51 stored in the ROM 50B to perform a setting process whose example is illustrated in FIG. 6. FIG. 6 is a flowchart illustrating an example of the flow of the setting process performed in the console 10 according to this embodiment. In addition, the timing when the CPU 50A performs the setting process is not limited, and the CPU 50A may perform the setting process at any timing. For example, the setting process may be performed at the timing when an instruction input from the user by the operation of the operation unit 56 after the positioning of the subject W ends is received or the timing when an instruction to emit the radiation R is received from the user.

Then, in Step S100 of FIG. 6, the second acquisition unit 62 acquires the body thickness information as described above. Specifically, the second acquisition unit 62 instructs the TOF camera 14 to capture a distance image and acquires the distance image captured by the TOF camera 14 on the basis of the instruction through the I/F unit 54. The second acquisition unit 62 acquires the body thickness information from the acquired distance image using the above-described Expression (1) or (2).

In addition, the timing when the TOF camera 14 captures the distance image and the timing when the second acquisition unit 62 acquires the body thickness information are not limited to this embodiment. For example, the TOF camera 14 may capture the distance image, triggered by the reception of a body thickness measurement instruction from the user, and the second acquisition unit 62 may acquire the captured distance image. In this case, the operation unit used by the user to input the body thickness measurement instruction is not particularly limited. For example, the operation unit may be the operation unit 56 of the console 10 or a measurement button or the like that is provided in the TOF camera 14.

In addition, the TOF camera 14 may capture the distance image, triggered by the registration of the imaging menu in the console 10, and the second acquisition unit 62 may acquire the captured distance image. In this case, for example, the distance image is captured while the user is positioning the subject W. Therefore, it is possible to present the measured value of the body thickness to the user in real time in accordance with a positioning state. Further, in addition to the measured value of the body thickness, the imaging conditions corresponding to the measured value of the body thickness can be derived and presented to the user. Furthermore, since the registration of the imaging menu in the console 10 is used as a trigger as described above, it is possible to perform the measurement of the body thickness and the acquisition of the body thickness information by the second acquisition unit 62 without the need for the user's operation.

The display unit 58 may display the physique of the subject determined from the measured body thickness and information on the imaging part in addition to the measured value of the body thickness. The physique may be represented in stages. For example, the physique may be represented in three stages of "thin", "standard", and "thick" in ascending order or may be represented in five stages of "extremely thin", "thin", "standard", "thick", and "extremely thick" in ascending order. The estimated physique is displayed on the display unit 58 of the console 10, which makes it possible for the user to more intuitively determine the validity of the measured value.

Then, in Step S102, the first acquisition unit 60 acquires the imaging part information from the imaging menu as described above.

Then, in Step S104, the target value derivation unit 64 derives the target value of the tube voltage kV and the target value of the mAs value, on the basis of the body thickness indicated by the body thickness information acquired in Step S100 and the imaging part indicated by the imaging part information acquired in Step S102. Specifically, the target value derivation unit 64 derives, as the target values, the tube voltage value and the mAs value corresponding to the body thickness indicated by the body thickness information, with reference to correspondence relationship information corresponding to the imaging part indicated by the imaging part information among the correspondence relationship information items stored in the storage unit 52.

Then, in Step S106, the target value derivation unit 64 outputs the target value of the tube voltage kV derived in Step S104 to the radiation emitting device 12 through the I/F unit 54. Then, in the radiation emitting device 12, the tube voltage value for emitting the radiation R is set.

Figure 7:
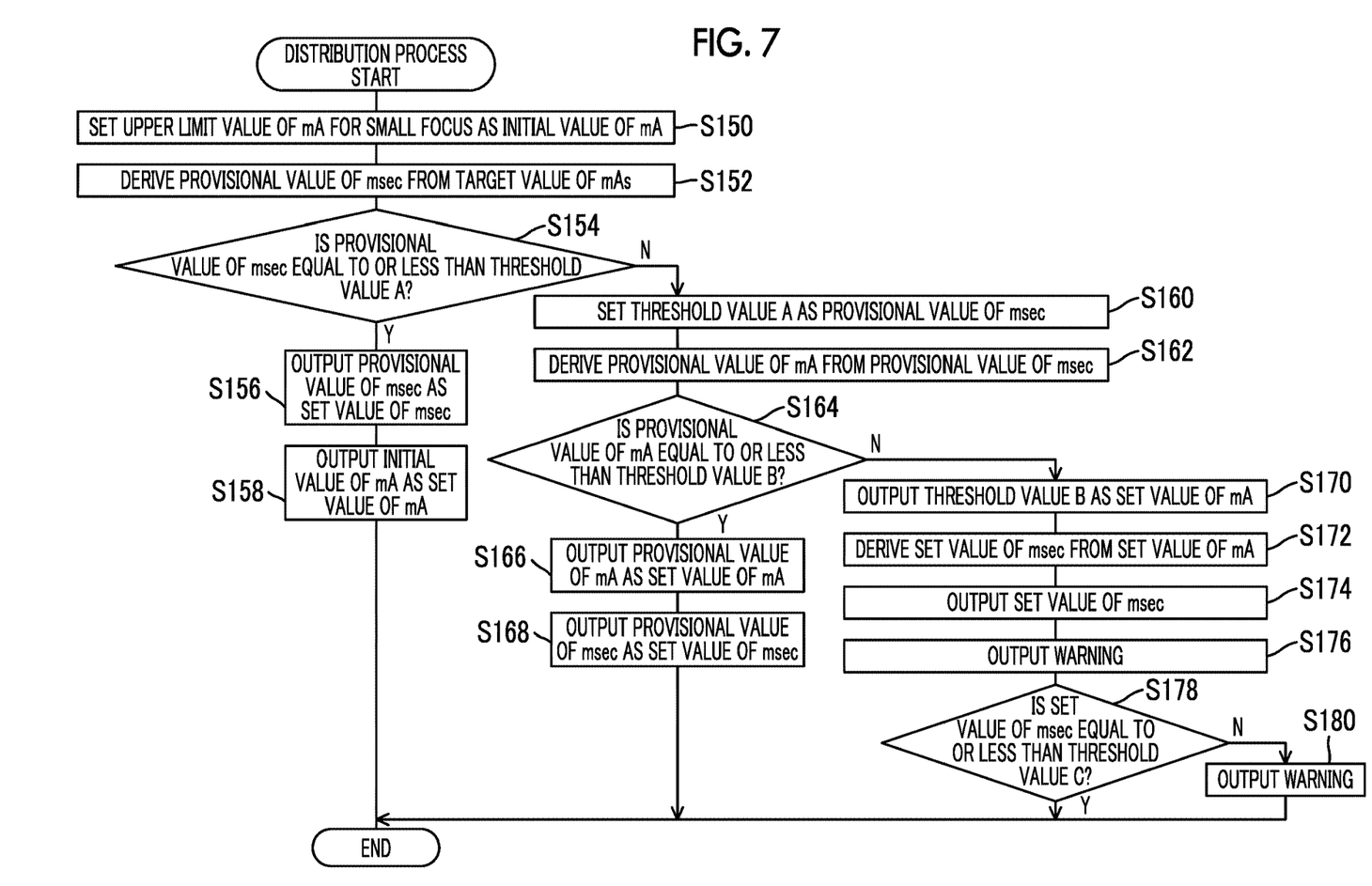
FIG. 7 is a flowchart showing an example of a flow of a distribution process performed in the setting process.

Then, in Step S108, the set value derivation unit 66 performs a distribution process of deriving the set value of the tube current mA for obtaining the target value of the mAs value derived in Step S104 and the set value of the irradiation time msec of the radiation R (hereinafter, simply referred to as an "irradiation time msec"). FIG. 7 is a flowchart illustrating an example of the distribution process performed by the set value derivation unit 66.

In Step S150 of FIG. 7, the set value derivation unit 66 sets the upper limit value of the tube current mA in a case in which the focus size is the small focus as an initial value of the tube current mA.

Then, in Step S152, the set value derivation unit 66 derives a provisional value of the irradiation time msec from the target value of the mAs value. Specifically, the provisional value of the irradiation time msec is derived by dividing the target value of the mAs value by the initial value of the tube current mA (the target value of the mAs value/the initial value of the tube current mA=the provisional value of the irradiation time msec).

Then, in Step S154, the set value derivation unit 66 determines whether or not the provisional value of the irradiation time msec is equal to or less than a threshold value A (the provisional value of the irradiation time msec≤the threshold value A). The threshold value A is the upper limit value of the described-above irradiation time. That is, the set value derivation unit 66 determines whether or not the provisional value of the irradiation time msec is equal to or less than the upper limit value of the irradiation time. In a case in which the provisional value of the irradiation time msec is equal to or less than the upper limit value of the irradiation time, the determination result in Step S154 is "Yes", and the process proceeds to Step S156.

In Step S156, the set value derivation unit 66 outputs the provisional value of the irradiation time msec as the set value of the irradiation time msec to the radiation emitting device 12. Then, in Step S158, the set value derivation unit 66 outputs the initial value of the tube current mA as the set value of the tube current mA to the radiation emitting device 12 and then ends the distribution process.

On the other hand, in a case in which the provisional value of the irradiation time msec is greater than the upper limit value of the irradiation time, the determination result in Step S154 is "No", and the process proceeds to Step S160. In Step S160, the set value derivation unit 66 sets the threshold value A as the provisional value of the irradiation time msec. Then, in Step S162, the set value derivation unit 66 derives a provisional value of the tube current mA from the provisional value of the irradiation time msec. The provisional value of the tube current mA derived here corresponds to the tube current value of the tube current in a case in which the focus size is large.

Then, in Step S164, the set value derivation unit 66 determines whether or not the provisional value of the tube current mA is equal to or less than a threshold value B (the provisional value of the tube current mA≤the threshold value B). The threshold value B is a value obtained by dividing the maximum output value of the tube of the radiation source 20 by the target value of the tube voltage kV derived in Step S104 (see FIG. 6) (the threshold value B=the maximum output value of the tube/the target value of the tube voltage kV). In a case in which the provisional value of the tube current mA is equal to or less than the threshold value B, the determination result in Step S164 is "Yes", and the process proceeds to Step S166.

In Step S166, the set value derivation unit 66 outputs the provisional value of the tube current mA as the set value of the tube current mA to the radiation emitting device 12 through the I/F unit 54. Then, in the radiation emitting device 12, the tube current value for emitting the radiation R is set.

Then, in Step S168, the set value derivation unit 66 outputs the provisional value of the irradiation time msec as the set value of the irradiation time msec to the radiation emitting device 12 through the I/F unit 54 and then ends the distribution process. Then, in the radiation emitting device 12, the irradiation time when the radiation R is emitted is set.

On the other hand, in a case in which the provisional value of the tube current mA is greater than the threshold value B in Step S164, the determination result in Step S164 is "No", and the process proceeds to Step S170. In Step S170, the set value derivation unit 66 outputs the threshold value B as the set value of the tube current mA to the radiation emitting device 12 through the I/F unit 54. Then, in the radiation emitting device 12, the tube current value for emitting the radiation R is set.

Then, in Step S172, the set value derivation unit 66 derives the set value of the irradiation time msec from the set value of the tube current mA. Specifically, the set value of the irradiation time msec is derived by dividing the target value of the mAs value by the set value of the tube current mA (the target value of the mAs value/the set value of the tube current mA=the set value of the irradiation time msec).

Then, in Step S174, the set value derivation unit 66 outputs the set value of the irradiation time msec derived in Step S172 to the radiation emitting device 12 through the I/F unit 54. Then, in the radiation emitting device 12, the irradiation time when the radiation R is emitted is set.

Then, in Step S176, the set value derivation unit 66 outputs information indicating a predetermined warning. The set value of the irradiation time msec output in Step S174 is greater than the upper limit value of the irradiation time msec. As described above, the set value of the irradiation time msec is determined according to the body movement of the subject. Therefore, in a case in which the radiation R is emitted for a long time greater than the upper limit value, there is a high possibility that the radiographic image will be blurred due to the body movement of the subject W. Therefore, in this step, warning information for warning a concern that the radiographic image will be blurred due to the body movement of the subject W is output. In addition, the specific content of the warning, the output destination of the warning, and a warning method are not particularly limited. For example, information indicating that there is a high possibility that the radiographic image will be blurred may be displayed on the display unit 58 by at least one of a visible display method or an audible display method.

In a case in which the warning in Step S176 is performed, for example, the user may take a radiographic image as it is. Further, for example, in a case in which there is a concern about the body movement of the subject W, the tube voltage kV set in the radiation emitting device 12 may be set to be greater than the set value output in Step S174 to increase the transmittance of the radiation R, thereby decreasing the required mAs value, that is, the target value of the mAs value. The irradiation time msec can be set within the upper limit value of the irradiation time by decreasing the target value of the mAs value to be less than the original target value in this way. In addition, in this case, since the tube voltage kV is increased, it exceeds the above-described maximum output value of the tube of the radiation source 20 unless the tube current mA is decreased. Therefore, since an error may occur, the user appropriately decreases the tube current mA.

Then, in Step S178, the set value derivation unit 66 determines whether or not the set value of the irradiation time msec is equal to or less than a threshold value C (the set value of the irradiation time msec≤the threshold value C). The threshold value C is the maximum value of the irradiation time set in the radiation emitting device 12 and is the maximum value of the time when charge is accumulated in the radiation detector 30. In a case in which the set value of the irradiation time msec is equal to or less than the threshold value C, the determination result in Step S178 is "Yes", and the distribution process illustrated in FIG. 7 ends.

On the other hand, in a case in which the set value of the irradiation time msec is greater than the threshold value C, the determination result in Step S178 is "No", and the process proceeds to Step S180. In Step S180, the set value derivation unit 66 outputs information indicating a predetermined warning and then ends the distribution process illustrated in FIG. 7. In this case, since the set value of the irradiation time msec is greater than the maximum value of the irradiation time set in the radiation emitting device 12, it is necessary to change the setting of the radiation emitting device 12. Therefore, warning information for warning that the setting of the radiation emitting device 12 needs to be changed is output. In addition, the specific content of the warning, the output destination of the warning, and a warning method are not particularly limited. For example, information necessary for changing the setting of the radiation emitting device 12 may be displayed on the display unit 58 by at least one of a visible display method or an audible display method.

In a case in which the distribution process illustrated in FIG. 7 ends in this way, the setting process illustrated in FIG. 6 ends.

As described above, the console 10 according to each of the above-described embodiments comprises the CPU 50A as at least one processor. The CPU 50A acquires the imaging part information indicating the imaging part of the subject W whose radiographic image is captured by the radiation R emitted from the radiation emitting device 12. In addition, the CPU 50A acquires the body thickness information indicating the body thickness of the subject W in the direction in which the radiation R is transmitted. Further, the CPU 50A derives the target values of the tube voltage kV and the mAs value of the radiation emitting device 12 for emitting the radiation R such that the dose of the radiation transmitted through the imaging part is the same as the dose at the reference body thickness, on the basis of the body thickness indicated by the acquired body thickness information and the imaging part indicated by the acquired imaging part information. In addition, the CPU 50A derives the set value of the tube current mA of the radiation emitting device 12 for obtaining the target mAs value and the set value of the irradiation time msec of the radiation R on the basis of at least one of the upper limit value of the irradiation time, the tube current corresponding to the focus size, or the maximum output value of the tube of the radiation emitting device 12.

As described above, the target value derivation unit 64 of the console 10 according to this embodiment derives the target value of the tube voltage kV and the target value of the mAs value for emitting the radiation R such that the dose of the radiation transmitted through the imaging part is the same as the dose at the reference body thickness, on the basis of the body thickness and the imaging part of the subject W. In addition, the set value derivation unit 66 derives the set value of the tube current mA of the radiation emitting device 12 for obtaining the target mAs value and the set value of the irradiation time msec of the radiation R, on the basis of the upper limit value of the irradiation time, the tube current corresponding to the focus size, and the maximum output value of the tube of the radiation emitting device 12.

Therefore, according to the console 10 of this embodiment, it is possible to easily set the imaging conditions corresponding to the imaging part and the body thickness of the subject W. In addition, according to the console 10 of this embodiment, appropriate tube voltage kV and mAs value which correspond to the imaging part and the body thickness of the subject W are automatically set. Therefore, it is possible to reduce the burden on the user for setting.

In addition, in this embodiment, the aspect in which the imaging conditions, such as the tube voltage kV, the tube current mA, and the irradiation time msec, are automatically set has been described. However, unlike this embodiment, the imaging conditions may be set by the user. For example, the user determines whether the imaging conditions are appropriate on the basis of the estimated body thickness information (or physique information) or the imaging conditions calculated from the body thickness information. In a case in which it is determined that the imaging conditions are appropriate, the user operates a setting transmission button included in the operation unit 56 of the console 10 to output the displayed imaging conditions to the radiation emitting device 12 through the I/F unit 54. In the radiation emitting device 12, the imaging conditions which have been derived from the console 10 and input from the console 10 are set. On the other hand, in a case in which the displayed body thickness information (or physique information) or the imaging conditions are changed, for example, the user inputs the desired body thickness (or physique) or the imaging conditions using the operation unit 56 and then operates the setting transmission button to output the imaging conditions to the radiation emitting device 12 through the I/F unit 54. In the radiation emitting device 12, the imaging conditions which have been input by the user and input from the console 10 are set.

As described above, the user can adjust the imaging conditions derived from the console 10, which makes it possible to easily set appropriate imaging conditions in the radiation emitting device 12 even in a case in which there is an error in the acquired body thickness information.

In a case in which the imaging conditions are automatically set on the basis of the measured body thickness value and there is an error in the estimation of the body thickness or the physique of the subject W, the user needs to manually correct the imaging conditions set in the radiation emitting device 12. On the other hand, in a case in which the user determines whether or not the estimation of the body thickness or the physique is correct, even though there is an error in the estimation, it is not necessary to correct the imaging conditions set in the radiation emitting device 12. The user only needs to designate an appropriate body thickness or physique in the console 10 and to operate the setting transmission button.

In addition, in a case in which the body thickness or the physique of the subject W is a standard physique, default imaging conditions which have already been set in the radiation emitting device 12, for example, default imaging conditions for the imaging part having the body thickness as the reference body thickness can be applied. Therefore, it is not necessary to change the imaging conditions. Therefore, it is not necessary to operate the setting transmission button. For example, in a case in which the user does not operate the setting transmission button even after a predetermined period of time has elapsed since the display of the imaging conditions on the display unit 58 by the console 10, the radiation emitting device 12 may apply the set default imaging conditions.

Further, in this embodiment, the aspect in which the set value of the tube current mA and the set value of the irradiation time msec are derived on the basis of all of the upper limit value of the irradiation time, the tube current corresponding to the focus size, and the maximum output value of the tube of the radiation emitting device 12 has been described. However, the present disclosure is not limited to this embodiment. The set value of the tube current mA and the set value of the irradiation time msec may be derived on the basis of at least one of the upper limit value of the irradiation time, the tube current corresponding to the focus size, or the maximum output value of the tube of the radiation emitting device 12. For example, the set values may be derived on the basis of one of these elements which has the highest priority.

Figure 8:
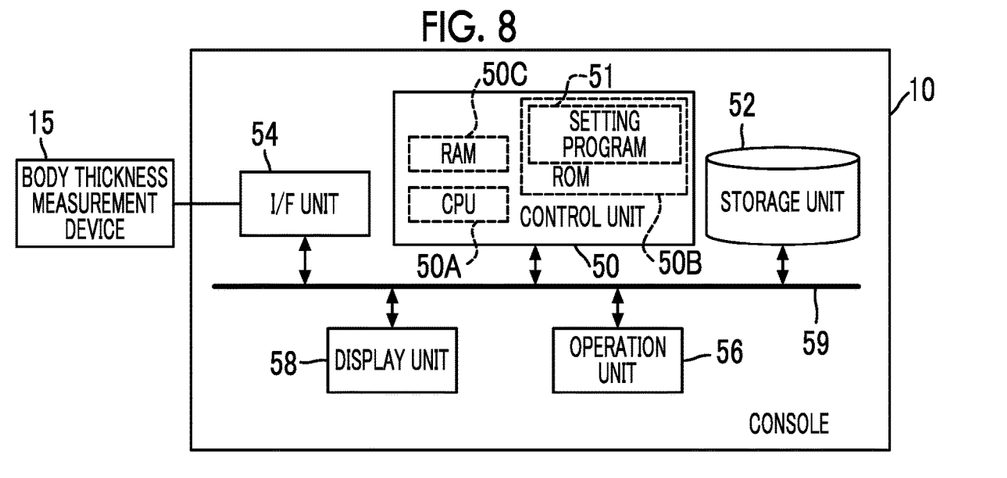
FIG. 8 is a functional block diagram illustrating an example of the functional configuration of the console according to the embodiment.

In addition, in this embodiment, a method using the distance image captured by the TOF camera 14 has been described as the method by which the console 10 acquires the body thickness of the subject W. However, the present disclosure is not limited to this method. For example, as illustrated in FIG. 8, the body thickness may be acquired by a body thickness measurement device 15 instead of the TOF camera 14.

For example, the body thickness measurement device 15 may be an imaging device that captures the distance image other than the TOF camera. For example, the following aspect may be used: a structured light method using an imaging device, which irradiates an object to be imaged with infrared light having a pattern and captures a distance image corresponding to reflected light from the object to be imaged, as the imaging device capturing the distance image is applied to capture the distance image. Further, for example, a depth-from-defocus (DFD) method that restores the distance on the basis of the degree of blurring of an edge region in the distance image may be applied. In the case of this aspect, for example, an aspect is known which uses a distance image captured by a monocular camera using a color aperture filter.

In addition, for example, a measurement device that measures a distance to an object to be measured, using ultrasonic waves, laser light, or the like emitted to the object to be measured, is given as an example of the body thickness measurement device 15. In this case, the second acquisition unit 62 acquires the measurement results of the STD and the SSD from the body thickness measurement device 15 and derives the body thickness t using the above-described Expression (1). Alternatively, the second acquisition unit 62 derives the body thickness t using the above-described Expression (2) on the basis of the SID, the TID, and the measurement result of the SSD acquired from the body thickness measurement device 15.

Further, for example, the body thickness measurement device 15 may be a caliper, a ruler, or the like. In this case, for example, an aspect may be used in which the user measures the body thickness of the subject W and inputs the measurement result using the operation unit 56 of the console 10. Furthermore, in this aspect, in a case in which the caliper, the ruler, or the like has a transmission function of transmitting the measurement result wirelessly or in a wired manner, the measurement result measured by the user may be transmitted from the body thickness measurement device 15 to the console 10 by the transmission function.

Moreover, for example, the body thickness measurement device 15 may be a visible light camera. The visible light camera is a so-called general camera and is a camera that captures a visible light image. Specifically, the visible light camera is a camera that receives visible light reflected by an object to be imaged using an imaging element and captures a visible light image on the basis of the received visible light. In this case, the visible light camera, which is the body thickness measurement device 15, captures, for example, a visible light image of the subject W and the imaging table 32 from the side surface (the x direction in FIG. 4) of the subject W and the imaging table 32. The second acquisition unit 62 may analyze the visible light image acquired from the body thickness measurement device 15 to derive the body thickness of the subject W.

In addition, in each of the above-described embodiments, the aspect in which the console 10, the radiation emitting device 12, and the radiography apparatus 16 are stationary in the radiography system 1 has been described. However, the radiography system 1 is not limited to this aspect. For example, a mobile cart, that is, a nursing cart may be used as the radiography system 1.

Further, in each of the above-described embodiments, the aspect in which the console 10 is an example of the setting device according to the present disclosure has been described. However, devices other than the console 10 may have the functions of the setting device according to the present disclosure. In other words, for example, the radiation emitting device 12, the radiography apparatus 16, or an external device other than the console 10 may have some or all of the functions of the first acquisition unit 60, the second acquisition unit 62, the target value derivation unit 64, and the set value derivation unit 66.

In addition, in each of the above-described embodiments, for example, the following various processors can be used as the hardware structure of processing units performing various processes such as the first acquisition unit 60, the second acquisition unit 62, the target value derivation unit 64, and the set value derivation unit 66. The various processors include, for example, a programmable logic device (PLD), such as a field programmable gate array (FPGA), that is a processor whose circuit configuration can be changed after manufacture and a dedicated electric circuit, such as an application specific integrated circuit (ASIC), that is a processor having a dedicated circuit configuration designed to perform a specific process, in addition to the CPU that is a general-purpose processor which executes software (programs) to function as various processing units as described above.

One processing unit may be configured by one of the various processors or a combination of two or more processors of the same type or different types (for example, a combination of a plurality of FPGAs or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

In addition, specifically, an electric circuit (circuitry) obtained by combining circuit elements, such as semiconductor elements, can be used as the hardware structure of the various processors.

Further, in each of the above-described embodiments, the aspect in which the setting program 51 is stored (installed) in the storage unit 52 in advance has been described. However, the present disclosure is not limited thereto. The setting program 51 may be recorded on a recording medium, such as a compact disc read only memory (CD-ROM), a digital versatile disc read only memory (DVD-ROM), or a universal serial bus (USB) memory, and then provided. In addition, the setting program 51 may be downloaded from an external device through the network.

The disclosure of JP2020-161413 filed on Sep. 25, 2020 is incorporated herein by reference in its entirety.

All of the documents, the patent applications, and the technical standards described in the specification are incorporated by reference herein to the same extent as it is specifically and individually stated that individual documents, patent applications, and technical standards are incorporated by reference.

What is claimed is:
1. A setting device comprising at least one processor, wherein the processor is configured to:
   acquire imaging part information indicating an imaging part of a subject whose radiographic image is captured by radiation emitted from a radiation emitting device;

acquire body thickness information indicating a body thickness of the subject in a direction in which the radiation is transmitted;

derive target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and derive a set value of a tube current of the radiation emitting device for obtaining the target mAs value and a set value of an irradiation time of the radiation on the basis of at least one parameter selected from the group consisting of an upper limit value of the irradiation time, a tube current corresponding to a focus size, and a maximum output value of a tube of the radiation emitting device, wherein:

the focus size includes a small focus and a large focus that is larger than the small focus, and in a case in which: (i) the focus size is the small focus, and (ii) an irradiation time of the radiation, when the target mAs value is obtained by an upper limit value of the tube current, is within the upper limit value of the irradiation time, the processor is configured to:

derive the upper limit value of the tube current as the set value of the tube current; and derive the irradiation time of the radiation when the target mAs value is obtained by the upper limit value of the tube current as the set value of the irradiation time.

2. A setting device comprising at least one processor, wherein the processor is configured to:

acquire imaging part information indicating an imaging part of a subject whose radiographic image is captured by radiation emitted from a radiation emitting device;

acquire body thickness information indicating a body thickness of the subject in a direction in which the radiation is transmitted;

derive target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and derive a set value of a tube current of the radiation emitting device for obtaining the target mAs value and a set value of an irradiation time of the radiation on the basis of at least one parameter selected from the group consisting of an upper limit value of the irradiation time, a tube current corresponding to a focus size, and a maximum output value of a tube of the radiation emitting device, wherein:

the focus size includes a small focus and a large focus that is larger than the small focus, and in a case in which: (i) the focus size is the small focus, and (ii) an irradiation time of the radiation, when the target mAs value is obtained by an upper limit value of the tube current, exceeds the upper limit value of the irradiation time, the processor is configured to:

derive the upper limit value of the irradiation time as the set value of the irradiation time; and derive a tube current value at which the target mAs value is obtained by the set value of the irradiation time as the set value of the tube current.

3. A setting device comprising at least one processor, wherein the processor is configured to:

acquire imaging part information indicating an imaging part of a subject whose radiographic image is captured by radiation emitted from a radiation emitting device;

acquire body thickness information indicating a body thickness of the subject in a direction in which the radiation is transmitted;

derive target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and derive a set value of a tube current of the radiation emitting device for obtaining the target mAs value and a set value of an irradiation time of the radiation on the basis of at least one parameter selected from the group consisting of an upper limit value of the irradiation time, a tube current corresponding to a focus size, and a maximum output value of a tube of the radiation emitting device, wherein:

the focus size includes a small focus and a large focus that is larger than the small focus, and in a case in which: (i) the focus size is the small focus, and (ii) an irradiation time of the radiation, when the target mAs value is obtained by an upper limit value of the tube current, exceeds the upper limit value of the irradiation time, the processor is configured to:

derive, as the set value of the tube current, a tube current value of the tube current in a case in which the focus size is the large focus; and derive an irradiation time of the radiation when the target mAs value is obtained by the set value of the tube current as the set value of the irradiation time.

4. The setting device according to claim 3, wherein the processor is configured to acquire the imaging part information from an imaging menu.

5. The setting device according to claim 3, wherein the processor is configured to acquire the body thickness information by subtracting a source-to-skin distance (SSD) from a source target distance (STD) to derive the body thickness.

6. The setting device according to claim 3, wherein the processor is configured to acquire the body thickness information by subtracting a source-to-skin distance (SSD) and a target-to-image receptor distance (TID) from a source-to-image receptor distance (SID) to derive the body thickness.

7. The setting device according to claim 3, wherein the processor is configured to output the target value of the tube voltage, the set value of the tube current, and the set value of the irradiation time to the radiation emitting device.

8. The setting device according to claim 3, wherein the processor is configured to determine the upper limit value of the irradiation time according to at least one of the imaging part, an age of the subject, or a gender of the subject.

9. A setting method executed by a processor, the setting method comprising:

acquiring imaging part information indicating an imaging part of a subject whose radiographic image is captured by radiation emitted from a radiation emitting device;

acquiring body thickness information indicating a body thickness of the subject in a direction in which the radiation is transmitted;

deriving target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and deriving a set value of a tube current of the radiation emitting device for obtaining the target mAs value and a set value of an irradiation time of the radiation on the basis of at least one parameter selected from the group consisting of an upper limit value of the irradiation time, a tube current corresponding to a focus size, and a maximum output value of a tube of the radiation emitting device, wherein the focus size includes a small focus and a large focus that is larger than the small focus, wherein the at least one parameter for deriving the set value of the tube current is selected according to whether or not an irradiation time of the radiation for obtaining the target mAs value by an upper limit value of the tube current, when the focus size is the small focus, is more than the upper limit value of the irradiation time, wherein, in a case in which: (i) the focus size is the small focus, and (ii) an irradiation time of the radiation, when the target mAs value is obtained by an upper limit value of the tube current, exceeds the upper limit value of the irradiation time, the processor is configured to:

derive, as the set value of the tube current, a tube current value of the tube current in a case in which the focus size is the large focus; and derive an irradiation time of the radiation when the target mAs value is obtained by the set value of the tube current as the set value of the irradiation time.

10. A non-transitory computer-readable storage medium storing a setting program that causes a processor to execute a process comprising:

acquiring imaging part information indicating an imaging part of a subject whose radiographic image is captured by radiation emitted from a radiation emitting device;

acquiring body thickness information indicating a body thickness of the subject in a direction in which the radiation is transmitted;

deriving target values of a tube voltage and a mAs value of the radiation emitting device for emitting the radiation such that a dose of the radiation transmitted through the imaging part is the same as a dose at a reference body thickness, on the basis of the body thickness indicated by the acquired body thickness information and the imaging part indicated by the acquired imaging part information; and deriving a set value of a tube current of the radiation emitting device for obtaining the target mAs value and a set value of an irradiation time of the radiation on the basis of at least one parameter selected from the group consisting of an upper limit value of the irradiation time, a tube current corresponding to a focus size, and a maximum output value of a tube of the radiation emitting device, wherein the focus size includes a small focus and a large focus that is larger than the small focus, and wherein the at least one parameter for deriving the set value of the tube current is selected according to whether or not an irradiation time of the radiation for obtaining the target mAs value by an upper limit value of the tube current, when the focus size is the small focus, is more than the upper limit value of the irradiation time, wherein, in a case in which: (i) the focus size is the small focus, and (ii) an irradiation time of the radiation, when the target mAs value is obtained by an upper limit value of the tube current, exceeds the upper limit value of the irradiation time, the processor is configured to:

derive, as the set value of the tube current, a tube current value of the tube current in a case in which the focus size is the large focus; and derive an irradiation time of the radiation when the target mAs value is obtained by the set value of the tube current as the set value of the irradiation time.

* * * * *